(12) United States Patent
Mansouri

(10) Patent No.: US 11,584,274 B1
(45) Date of Patent: Feb. 21, 2023

(54) MODULAR LEG ASSEMBLY FOR PASSENGER SEAT

(71) Applicant: Safran Seats USA LLC, Gainesville, TX (US)

(72) Inventor: Reza Mansouri, Costa Mesa, CA (US)

(73) Assignee: Safran Seats USA LL C, Gainesville, TX (US)

( * ) Notice: Subject to any disclaimer, the term of this patent is extended or adjusted under 35 U.S.C. 154(b) by 0 days.

(21) Appl. No.: 17/467,006

(22) Filed: Sep. 3, 2021

(51) Int. Cl.
| | |
|---|---|
| *B64D 11/06* | (2006.01) |
| *B60N 2/68* | (2006.01) |
| *B60N 2/42* | (2006.01) |
| *B61D 33/00* | (2006.01) |
| *B60N 2/005* | (2006.01) |

(52) U.S. Cl.
CPC ............. *B60N 2/682* (2013.01); *B60N 2/005* (2013.01); *B60N 2/42* (2013.01); *B61D 33/0078* (2013.01); *B64D 11/0619* (2014.12); *B64D 11/0648* (2014.12); *B64D 11/0696* (2013.01)

(58) Field of Classification Search
CPC ............................ B64D 11/0648; B60N 2/682
See application file for complete search history.

(56) References Cited

U.S. PATENT DOCUMENTS

| | | | |
|---|---|---|---|
| 2,991,830 A * | 7/1961 | Abel | .................. B64D 11/0648 403/103 |
| 5,152,578 A | 10/1992 | Kiguchi | |
| 5,522,640 A | 6/1996 | Bilezikjian | |
| 6,896,324 B1 * | 5/2005 | Kull | ................... B64D 11/0689 297/216.13 |
| 11,027,847 B2 | 6/2021 | Itzinger | |
| 2003/0094542 A1 | 5/2003 | Williamson | |
| 2003/0094838 A1 * | 5/2003 | Williamson | ....... B64D 11/0696 297/232 |
| 2011/0101162 A1 | 5/2011 | Zimmermann et al. | |
| 2017/0113803 A1 * | 4/2017 | Maslakow | ......... B64D 11/0648 |

(Continued)

FOREIGN PATENT DOCUMENTS

| | | | | |
|---|---|---|---|---|
| CZ | 2018387 A3 | * | 8/2018 | |
| DE | 102012020032 A1 | * | 4/2014 | ............. B60N 2/015 |
| DE | 102017101111 A1 | * | 7/2017 | ............. B60P 7/0815 |

(Continued)

OTHER PUBLICATIONS

International Patent Application No. PCT/US2022/039528, International Search Report and Written Opinion, dated Nov. 14, 2022.

*Primary Examiner* — Timothy J Brindley
(74) *Attorney, Agent, or Firm* — Kilpatrick Townsend & Stockton LLP

(57) ABSTRACT

Described are modular leg assemblies for passenger seats. The modular leg assemblies can include a universal first leg member, a universal second leg member, a size specific member, and a universal seat frame tube receptor. The universal first leg member may be coupled to a first seat track fitting. The universal second leg member may be coupled to a second seat track fitting. The size specific member may be coupled to the universal first leg member and to the universal second leg member. At least one of the universal second leg member or the universal seat frame tube receptor can include a set of attachment points for coupling the universal seat frame tube receptor to the universal second leg member.

20 Claims, 7 Drawing Sheets

(56) References Cited

U.S. PATENT DOCUMENTS

2021/0387732 A1* 12/2021 Salzer ................ B64D 11/0696

FOREIGN PATENT DOCUMENTS

| DE | 102019127049 A1 * | 4/2021 | ......... B64D 11/0648 |
| WO | 2010108681 A2 | 9/2010 | |
| WO | WO-2010108669 A2 * | 9/2010 | ............... B60N 2/68 |
| WO | WO-2017044157 A1 * | 3/2017 | ......... B64D 11/0648 |
| WO | WO-2017109188 A1 * | 6/2017 | ............... B60N 2/12 |
| WO | WO-2022075968 A1 * | 4/2022 | |

* cited by examiner

MODULAR LEG ASSEMBLY FOR PASSENGER SEAT

FIELD OF THE INVENTION

The field of the invention relates to passenger seats, and, more particularly, to modular leg assemblies for passenger seats.

BACKGROUND

Passenger vehicles, such as aircraft, buses, trains, ships, and automobiles, often include one or more passenger seats in which passengers may be seated and otherwise use during travel. A passenger seat may include a leg assembly that connects the passenger seat to a base of the passenger vehicle, such as a floor, track, etc. Traditionally, such leg assemblies have been a single-piece construction so different sized leg assemblies would be needed based on the distance between the connections to the base of the passenger vehicle. Such leg assemblies are difficult to standardize, costly to produce, and generate significant material waste during manufacturing.

SUMMARY

The terms "invention," "the invention," "this invention" and "the present invention" used in this patent are intended to refer broadly to all of the subject matter of this patent and the patent claims below. Statements containing these terms should be understood not to limit the subject matter described herein or to limit the meaning or scope of the patent claims below. Embodiments of the invention covered by this patent are defined by the claims below, not this summary. This summary is a high-level overview of various aspects of the invention and introduces some of the concepts that are further described in the Detailed Description section below. This summary is not intended to identify key or essential features of the claimed subject matter, nor is it intended to be used in isolation to determine the scope of the claimed subject matter. The subject matter should be understood by reference to appropriate portions of the entire specification of this patent, any or all drawings and each claim.

According to certain embodiments of the present invention, a modular leg assembly for a passenger seat can include a universal first leg member, a universal second leg member, a size specific member, and a universal seat frame tube receptor. The universal first leg member may be coupled to a first seat track fitting. The universal second leg member may be coupled to a second seat track fitting. The size specific member may be coupled to the universal first leg member and to the universal second leg member. At least one of the universal second leg member or the universal seat frame tube receptor may include a set of attachment points for coupling the universal seat frame tube receptor to the universal second leg member.

In some embodiments, the universal seat frame tube receptor may be coupled to the universal second leg member using at least one of the attachment points using at least one of a fastener or a rotary joint. In certain embodiments, the attachment points may allow the modular leg assembly to be used for a set of distances between the first seat track fitting and the second seat track fitting. In various embodiments, the universal first leg member may be coupled to a first seat tube, and the universal seat frame tube receptor may be coupled to a second seat tube. In some embodiments, the attachment points can allow the modular leg assembly to be used for a set of distances between the first seat track fitting and the second seat track fitting while maintaining a set distance between the first seat tube and the second seat tube.

In some embodiments, the universal seat frame tube receptor may be rotated about the second seat tube when coupled to the second seat tube. In certain embodiments, the universal seat frame tube receptor may form an energy absorber for the modular leg. In some embodiments, the universal seat frame tube receptor may be formed of H1150 steel to increase an energy absorption of the universal seat frame tube receptor. In various embodiments, the size specific member may be replaced with a second size specific member that may be coupled to the universal first leg member and to the universal second leg member.

According to certain embodiments of the present invention, a method may involve assembling a modular leg assembly that may include a universal first leg member, a universal second leg member, a size specific member, and a universal seat frame tube receptor such that at least one of the universal second leg member or the universal seat frame tube receptor may include a set of attachment points. The method may include coupling the universal first leg member to a first seat track fitting. The method may include coupling the universal second leg member to a second seat track fitting. The method may include coupling the size specific member to the universal first leg member and the universal second leg member. The method may include coupling the universal seat frame tube receptor to the universal second leg member via at least one of the attachment points.

In certain embodiments, the method may additionally include determining at which of the attachment points to couple the universal seat frame tube receptor to the universal second leg member based on a distance between the first seat track fitting and the second seat track fitting. In various embodiments, the method may additionally include coupling the universal seat frame tube receptor to the universal second leg member via at least one of the attachment points using at least one of a fastener or a rotary joint. In some embodiments, the method may additionally include coupling the universal first leg member to a first seat tube and coupling the universal seat frame tube receptor to a second seat tube. In certain embodiments, the attachment points may allow the modular leg assembly to be used for a set of distances between the first seat track fitting and the second seat track fitting while maintaining a set distance between the first seat tube and the second seat tube. In various embodiments, the universal seat frame tube receptor may form an energy absorber for the modular leg assembly.

According to certain embodiments of the present invention, a passenger seat may include a modular leg assembly that may include a universal first leg member, a universal second leg member, a size specific member, and a universal seat frame tube receptor. The universal first leg member may be coupled to a first seat track fitting. The universal second leg member may be coupled to a second seat track fitting. The size specific member may be coupled to the universal first leg member and the universal second leg member. At least one of the universal second leg member or the universal seat frame tube receptor may include a set of attachment points for coupling the universal seat frame tube receptor to the universal second leg member.

In various embodiments, the universal seat frame tube receptor may be coupled to the universal second leg member using at least one of the attachment points using at least one of a fastener or a rotary joint. In some embodiments, the attachment points may allow the modular leg assembly to be used for a set of distances between the first seat track fitting and the second seat track fitting. In certain embodiments, the universal first leg member may be coupled to a first seat tube, and the universal seat frame tube receptor may be coupled to a second seat tube. The attachment points may allow the modular leg assembly to be used for a set of distances between the first seat track fitting and the second seat track fitting while maintaining a set distance between the first seat tube and the second seat tube. In various embodiments, the universal seat frame tube receptor may form an energy absorber for the modular leg.

DETAILED DESCRIPTION

The subject matter of embodiments of the present invention is described here with specificity to meet statutory requirements, but this description is not necessarily intended to limit the scope of the claims. The claimed subject matter may be embodied in other ways, may include different elements or steps, and may be used in conjunction with other existing or future technologies. This description should not be interpreted as implying any particular order or arrangement among or between various steps or elements except when the order of individual steps or arrangement of elements is explicitly described.

The described embodiments of the invention provide modular leg assemblies for passenger seats. While the modular leg assemblies are discussed for use with aircraft seats, they are by no means so limited. Rather, embodiments of the modular leg assemblies may be used in passenger seats or other seats of any type or otherwise as desired.

Figure 1:
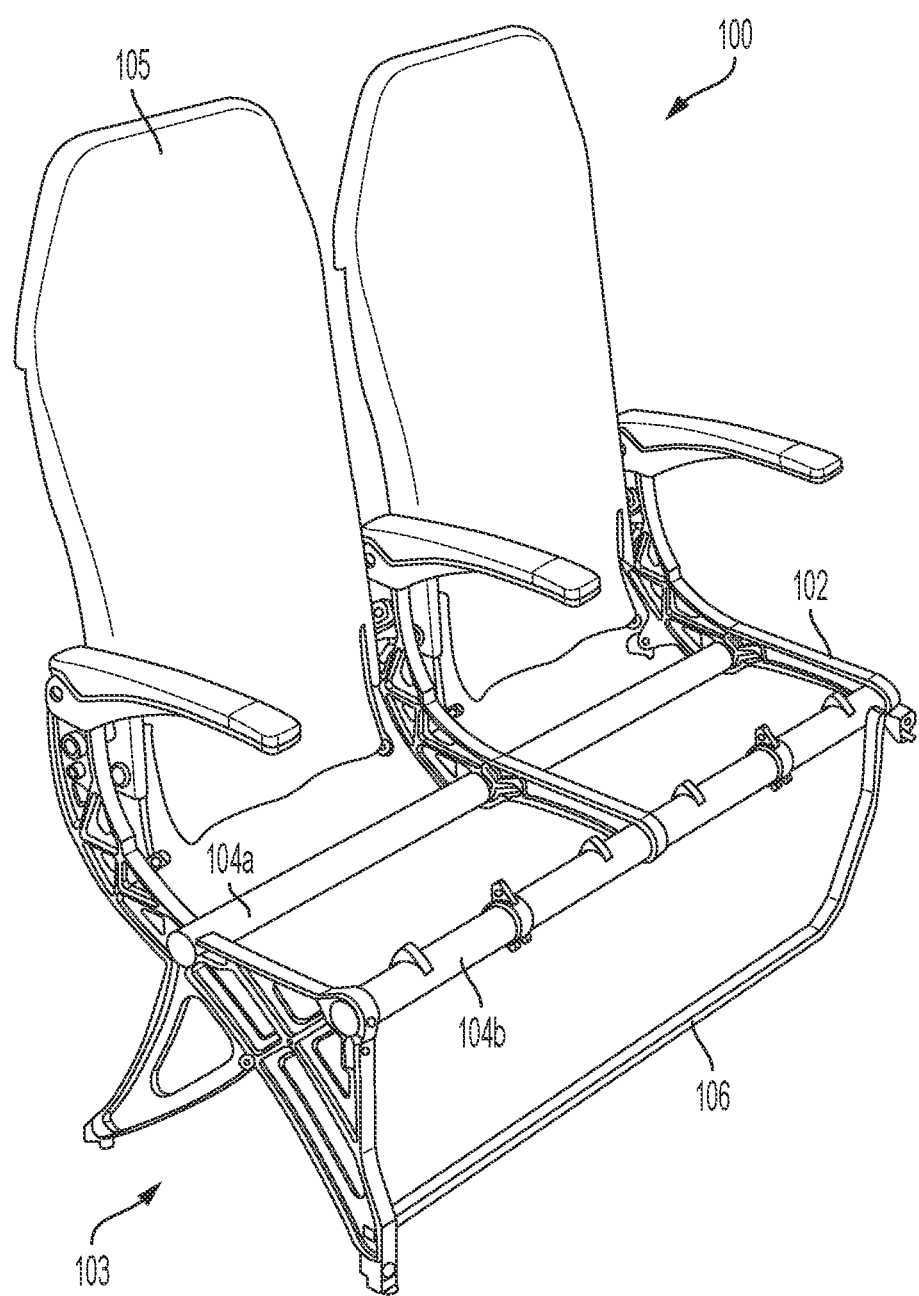
FIG. 1 is a perspective view of a generalized passenger seat according to certain embodiments of the present invention.
Figure 2:
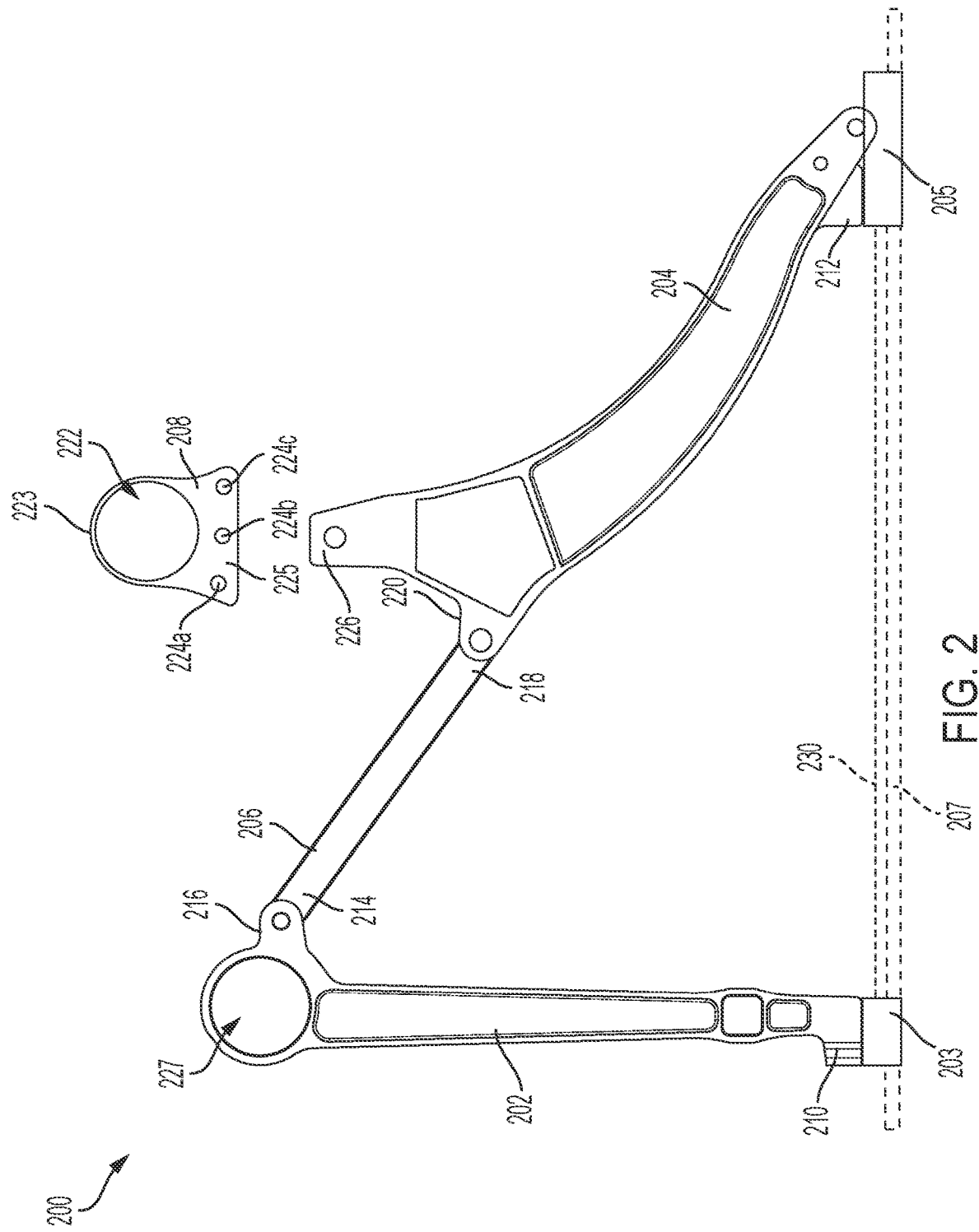
FIG. 2 is an exploded view of a modular leg assembly of a passenger seat according to certain embodiments of the present invention.

FIG. 1 is a perspective view of a generalized passenger seat 100 according to certain embodiments of the present invention. The generalized passenger seat 100 may include one or more base-frame assemblies 102 and one or more seat back assemblies 105 that may include various components that provide support for a passenger in the generalized passenger seat 100. Various components include, but are not limited to, one or more spreaders, arm rests, etc. The generalized passenger seat 100 may be coupled to a seat track via a set of seat track fittings (e.g., a first seat track fitting and a second seat track fitting).

The generalized passenger seat 100 may include a leg assembly 103 that may mechanically couple or otherwise couple the generalized passenger seat 100 to a floor and/or the seat track of a passenger vehicle such as an airplane or other suitable passenger vehicle. As illustrated, the leg assembly 103 is a single-part leg assembly in which the leg assembly 103 contains one piece. Additionally, as illustrated, couplings associated with the leg assembly 103 may be fixed. While the leg assembly 103 is illustrated as a single component in FIG. 1, in other embodiments, and as discussed in detail below with reference to FIGS. 2-6, the leg assembly 103 may be a multi-part assembly.

In certain embodiments, the generalized passenger seat 100 may include at least one structural tube 104, and in certain embodiments, the generalized passenger seat 100 may include two or more structural tubes 104. Accordingly, while two structural tubes 104a-b are illustrated, the generalized passenger seat 100 may include any number of structural tubes 104 as desired, including a single structural tube 104 or more than two structural tubes 104. The structural tubes 104 may include uniform structural tubes, non-uniform structural tubes, or a combination thereof. Moreover, the particular structural tubes 104 illustrated should not be considered limiting, and other portions of the base-frame assemblies 102 may include a structural tube 104 as desired. A fully assembled generalized passenger seat 100 may include various cushioning, a bottom seat pan, in-flight entertainment equipment, tray tables, and/or other components as desired. Optionally, the generalized passenger seat 100 may include a baggage bar 106 that may be coupled to the leg assembly 103.

According to certain embodiments of the present invention, and as best illustrated in FIGS. 2-6, a modular leg assembly 200 for a passenger seat may include a universal first leg member 202, a universal second leg member 204, a size specific member 206, and a universal seat frame tube receptor 208. In some embodiments, the modular leg assembly 200 may be included in a passenger seat (e.g., in the generalized passenger seat 100 instead of the leg assembly 103). The components of the modular leg assembly 200 (e.g., the universal first leg member 202, the universal second leg member 204, etc.) may be formed of any suitable materials including but not limited to aluminum, stainless steel, aramid fibers, polycarbonate, polypropylene, other metallic materials, composite materials, or other similar materials. In some embodiments, the modular leg assembly 200 may include more or fewer components as desired.

The universal first leg member 202 may be coupled to a first seat track fitting 203, and the universal second leg member 204 may be coupled to a second seat track fitting 205. For example, a first end 210 of the universal first leg member 202 may be positioned adjacent to or interlocking with the first seat track fitting 203 and may be mechanically, or otherwise suitably, coupled to the first seat track fitting 203. Additionally, a first end 212 of the universal second leg member 204 may be positioned adjacent to or interlocking with the second seat track fitting 205 and may be mechanically, or otherwise suitably, coupled to the second seat track fitting 205. In some embodiments, the first seat track fitting 203 may be a forward fitting that may be coupled to a seat track 207, and the second seat track fitting 205 may be an aft fitting that may be coupled to the seat track 207. In these embodiments, the passenger seat may be coupled to the seat track 207 via the first seat track fitting 203 and the second seat track fitting 205.

In some embodiments, the universal first leg member 202 may additionally include an opening 227 proximate a second end 216 of the universal first leg member 202 that may permit the universal first leg member 202, and, by extension, the modular leg assembly 200, to be coupled to a first base frame tube (e.g., the structural tube 104*b*) of the passenger seat.

The size specific member 206 can mechanically couple, or otherwise suitably connect, the universal first leg member 202 and the universal second leg member 204. For example, a first end 214 of the size specific member 206 may be positioned adjacent to, e.g., near to, interlocking, abutting, etc., the second end 216 of the universal first leg member 202, and a second end 218 of the size specific member 206 may be positioned adjacent to, e.g., near to, interlocking, abutting, etc., a second end 220 of the universal second leg member 204. The first end 214 of the size specific member 206 may be coupled to the second end 216 of the universal first leg member 202, and the second end 218 of the size specific member 206 may be coupled to the second end 220 of the universal second leg member 204. In some examples, the size specific member 206 may be coupled to the universal first leg member 202, to the universal second leg member 204, or a combination thereof, via suitable fasteners, which can include screws, bolts, rivets, or other mechanical or chemical fasteners.

The size specific member 206 may be replaceable or interchangeable based on the sizing and/or spacing needs of the modular leg assembly 200. For example, the size specific member 206 may be a first size specific member, and a second size specific member may be used instead of the first size specific member for coupling the universal first leg member 202 and the universal second leg member 204. In some embodiments, the first size specific member may be characterized by a different shape, size (e.g., length, width, etc.), material, or other suitable difference with respect to the second size specific member. In some embodiments, the size specific member 206 may be selected based on a distance between the first seat track fitting 203 and the second seat track fitting 205 or a distance between the first end 210 of the universal first leg member 202 and the first end 212 of the universal second leg member 204.

In certain embodiments, the universal seat frame tube receptor 208 may include an opening 222, which may be positioned on a top side 223 of the universal seat frame tube receptor 208. The opening 222 may permit the universal seat frame tube receptor 208, and, by extension, the modular leg assembly 200, to be coupled to a second base frame tube (e.g., the structural tube 104*a*) of a passenger seat. In some embodiments, when coupled to the second base frame tube, the universal seat frame tube receptor 208 may be rotated about the first base frame tube, which may help to reduce a stress applied to the second base frame tube by the universal seat frame tube receptor 208 and, by extension, the modular leg assemble 200.

Additionally, the universal seat frame tube receptor 208 may be formed of H1150 steel, or any other similar material, for increasing an energy absorption of the universal seat frame tube receptor 208 compared with components formed of other material. In some embodiments, the universal seat frame tube receptor 208 may be formed of a material characterized by a high elongation for increasing the energy absorption of the universal seat frame tube receptor 208. In some embodiments, the universal seat frame tube receptor 208 may be formed of other suitable material for increasing the energy absorption of the universal seat frame tube receptor 208. For example, the universal seat frame tube receptor 208 may be formed of materials including but not limited to aluminum, stainless steel, aramid fibers, polycarbonate, polypropylene, other metallic materials, composite materials, or other similar materials. By increasing the energy absorption, the universal seat frame tube receptor 208 may form an energy absorber for the modular leg assembly 200. For example, during a dynamic event, such as a crash, turbulence, high swell waters, etc., the universal seat frame tube receptor 208 may absorb, or otherwise distribute, a load or stress applied to the modular leg assembly 200 from the dynamic event.

Figure 3:
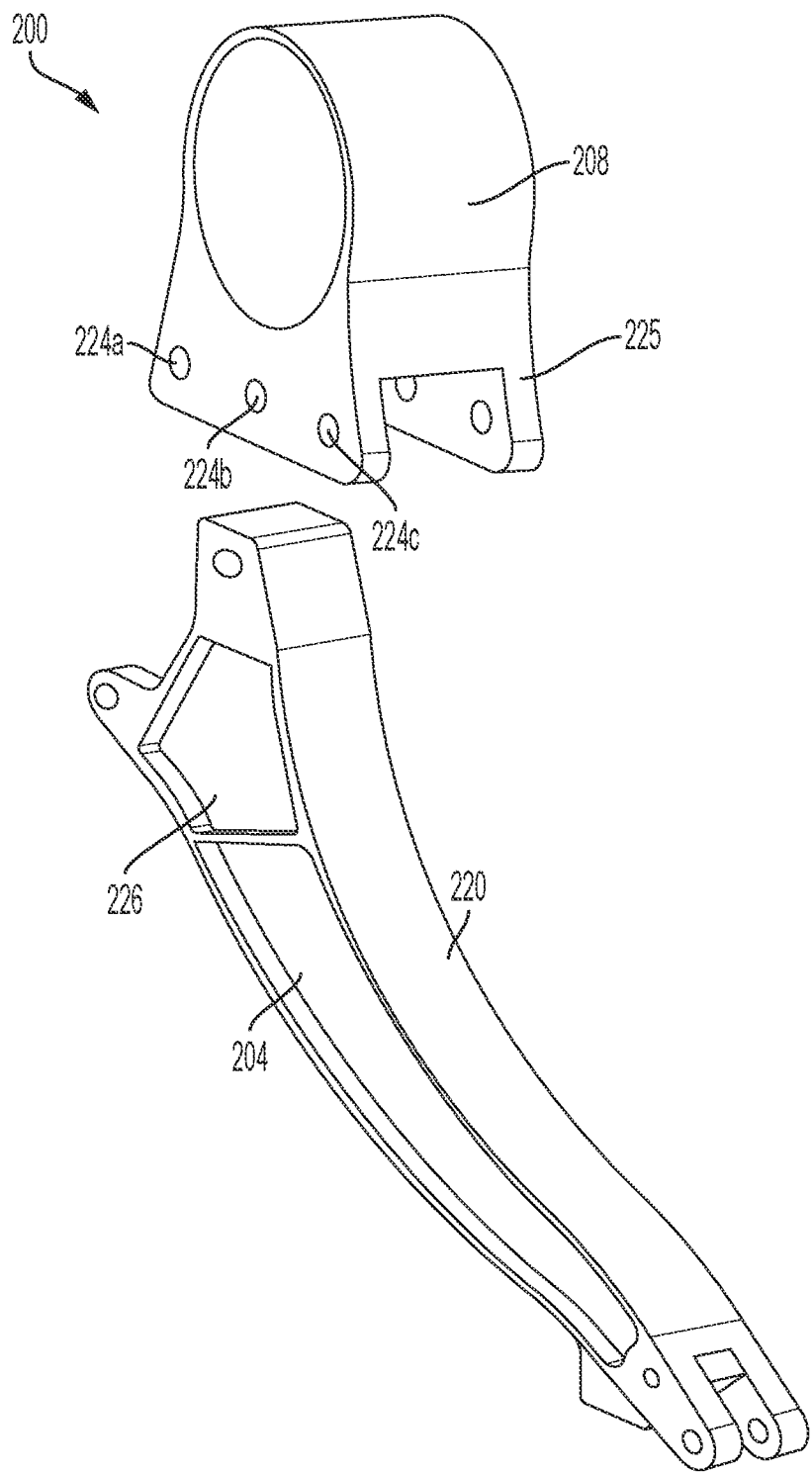
FIG. 3 is a perspective view of an universal seat frame tube receptor and a leg member of the modular leg assembly of FIG. 2.

Additionally, as further illustrated in FIG. 3, the universal seat frame tube receptor 208 may include a set of attachment points 224*a-c*, which may be positioned on a bottom side 225 of the universal seat frame tube receptor 208. The universal seat frame tube receptor 208 may be coupled to the universal second leg member 204 via one or more of the attachment points 224*a-c*. For example, the universal second leg member 204 may include at least one attachment point 226, and at least one of the attachment points 224*a-c* may be positioned adjacent to, e.g., near to, interlocking, abutting, etc., the at least one attachment point 226 for coupling the universal seat frame tube receptor 208 to the universal second leg member 204.

At least one of the attachment points 224*a-c* of the universal seat frame tube receptor 208 may be used to couple the universal seat frame tube receptor 208 to the at least one attachment point 226, or other suitable portion, of the universal second leg member 204. For example, the attachment point 224*a* may be used to couple the universal seat frame tube receptor 208 to the universal second leg member 204. Alternatively, the attachment point 224*b* may be used to couple the universal seat frame tube receptor 208 to the universal second leg member 204. Alternatively, the attachment point 224*c* may be used to couple the universal seat frame tube receptor 208 to the universal second leg member 204. While illustrated as including three attachment points 224*a-c*, the universal seat frame tube receptor 208 may include other suitable amounts of attachment points 224, such as less than three or more than three. In some embodiments, the universal seat frame tube receptor 208 may be coupled to the universal second leg member 204 via at least one of the attachment points 224*a-c* using at least one of a fastener or a rotary joint. In some embodiments, the rotary joint may reduce an amount of stress applied to the second base frame tube when the universal seat frame tube receptor 208 is coupled to the second base frame tube.

In some embodiments, the universal first leg member 202, the universal second leg member 204, and the universal seat frame tube receptor 208 may be standard manufactured parts of the modular leg assembly 200 that may be used regardless of the distance between the first seat track fitting 203 and the second seat track fitting 205. By having the universal first leg member 202, the universal second leg member 204, and the universal seat frame tube receptor 208 be standard manufactured parts, the cost of making each part, and thus the modular leg assembly 200, may be reduced because the standard manufactured parts may be produced in higher volumes and using a more efficient use of material. The size specific member, which is often less expensive to produce than the standard manufactured parts, may then be selected based on the distance between the first seat track fitting 203 and the second seat track fitting 205.

The modular leg assembly 200 may be characterized by a distance 230 that may represent the distance between the first seat track fitting 203 and the second seat track fitting 205. The distance 230 may be determined, or otherwise adjusted, based on the use of the attachment points 224*a-c* for coupling the universal seat frame tube receptor 208 to the universal second leg member 204. For example, the distance 230 associated with the attachment point 224*a* may be smaller than the distance 230 associated with the attachment point 224*b*, which may be smaller than the distance 230 associated with the attachment point 224*c*. In some embodiments, the distance 230 associated with the attachment points 224*a-c* may be 18 inches (45.72 cm) for the attachment point 224*a*, 19 inches (48.26 cm) for the attachment point 224*b*, and 20 inches (50.8 cm) for the attachment point 224*c*.

Figure 4:
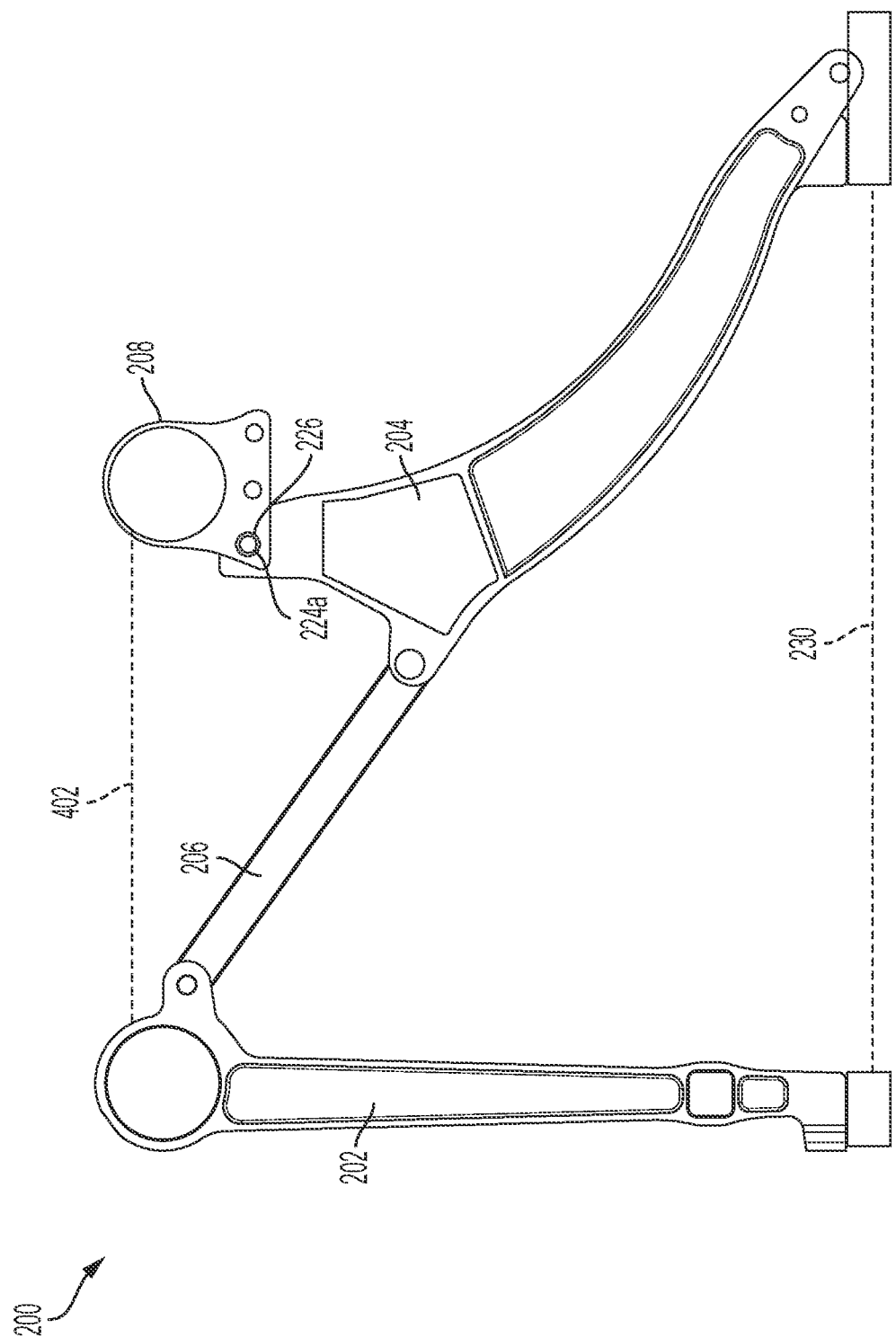
FIG. 4 is a side-view of the modular leg assembly of FIG. 2.
Figure 5:
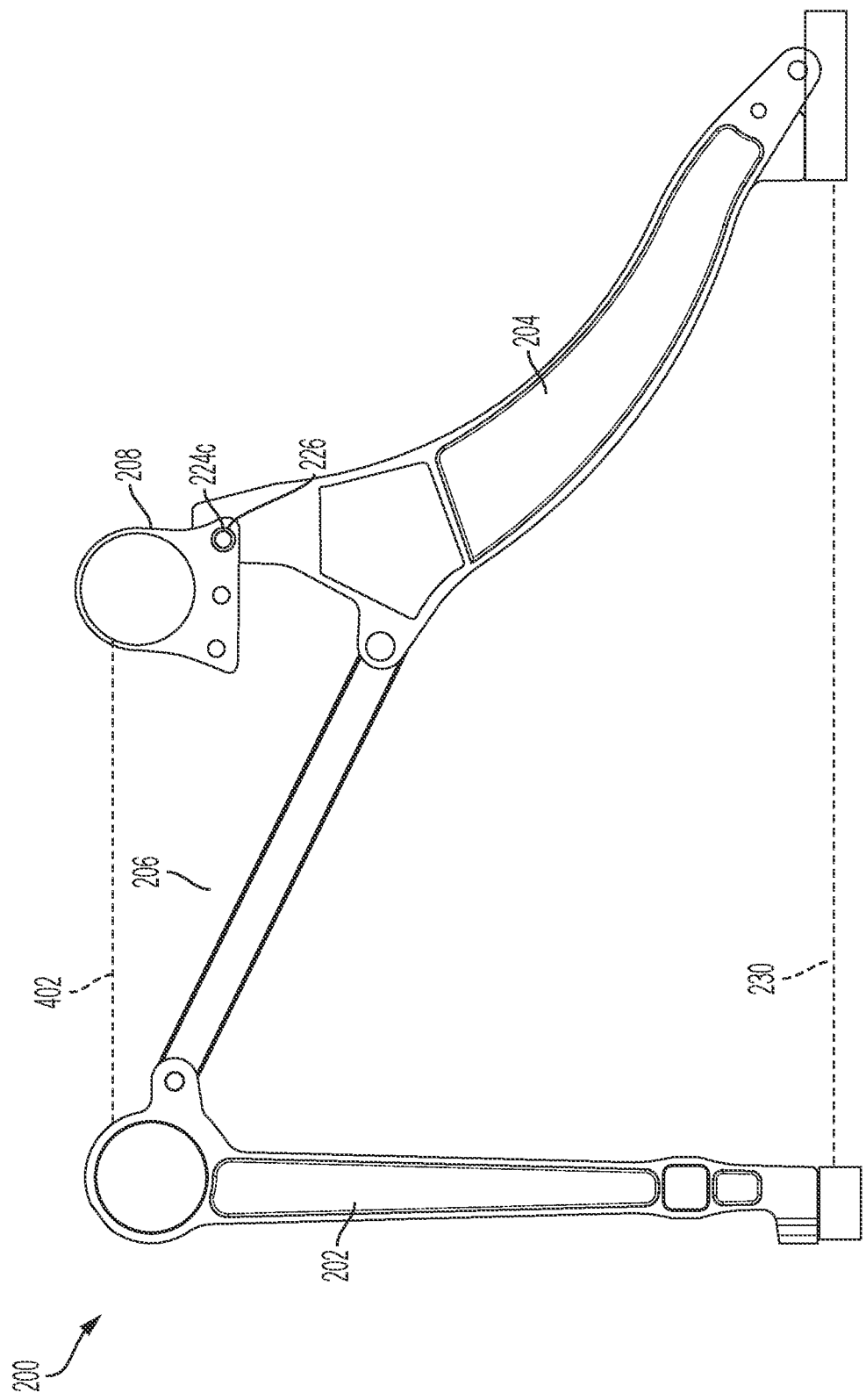
FIG. 5 is another side-view of the modular leg assembly of FIG. 2.

In some embodiments, and as best illustrated in FIGS. 4 and 5, while the distance 230 may be variable with respect to the attachment points 224, a distance 402 may be fixed. For example, the distance 402 may remain constant regardless of the attachment point 224*a-c* used to couple the universal seat frame tube receptor 208 to the universal second leg member 204. In some embodiments, the distance 402 may represent a distance between tubes of the passenger seat (e.g., the distance between the structural tubes 104*a-b* of the generalized passenger seat 100).

As illustrated in FIG. 4, the attachment point 224*a* may be used to couple the universal seat frame tube receptor 208 to the universal second leg member 204 via the attachment point 226. In contrast, as illustrated in FIG. 5, the attachment point 224*c* may be used to couple the universal seat frame tube receptor 208 to the universal second leg member 204 via the attachment point 226. The distance 230 illustrated in FIG. 4 may be less than the distance 230 illustrated in FIG. 5.

Figure 6:
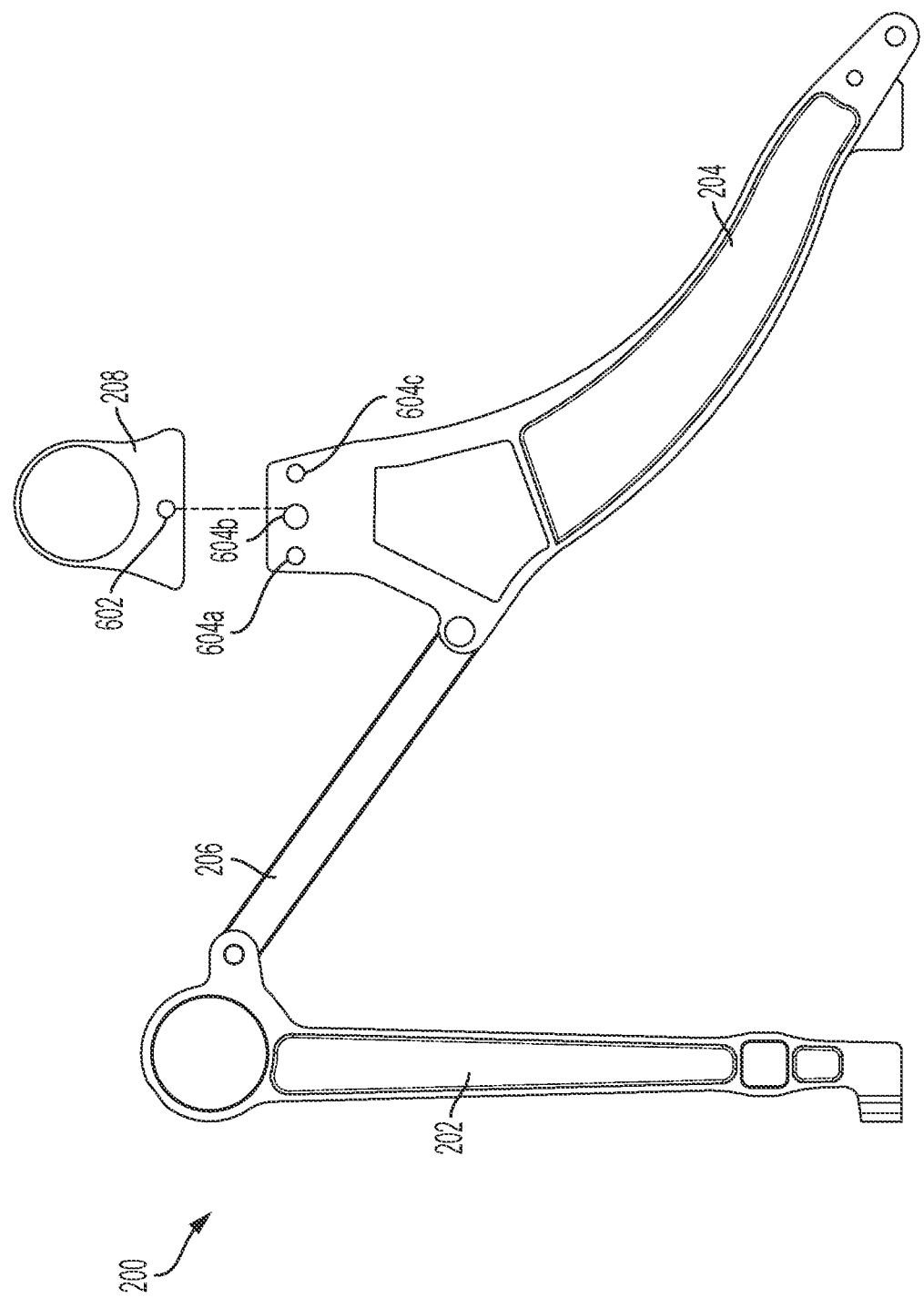
FIG. 6 is an exploded view of another example of a modular leg assembly for a passenger seat according to certain embodiments of the present invention.

As best illustrated by FIG. 6, and alternative to or in conjunction with the universal seat frame tube receptor 208 including three attachment points, the universal seat frame tube receptor 208 may include at least one attachment point 602, while the universal second leg member 204 may include at least three attachment points 604*a-c*. The universal seat frame tube receptor 208 may be coupled, using the at least one attachment point 602, to the universal second leg member 204 using at least one of the attachment points 604*a-c* via suitable fasteners, which include but are not limited to screws, bolts, rivets or other mechanical or chemical fasteners.

Each of the components of the modular leg assembly 200 (e.g., the universal first leg member 202, the universal second leg member 204, the size specific member 206, the universal seat frame tube receptor 208, etc.) may be formed via various manufacturing processes as desired. Suitable manufacturing processes include, but are not limited to, machining, forging, casting, printing, molding, combinations thereof, or other processes as desired. In some embodiments, the manufacturing process used to form one component may be different from the manufacturing process used to form another component. In some embodiments, the universal first leg member 202 or the universal second leg member 204 may be formed via forging, and the size specific member 206 may be formed via 3-D stamping, 3-D cutting, etc.

Figure 7:
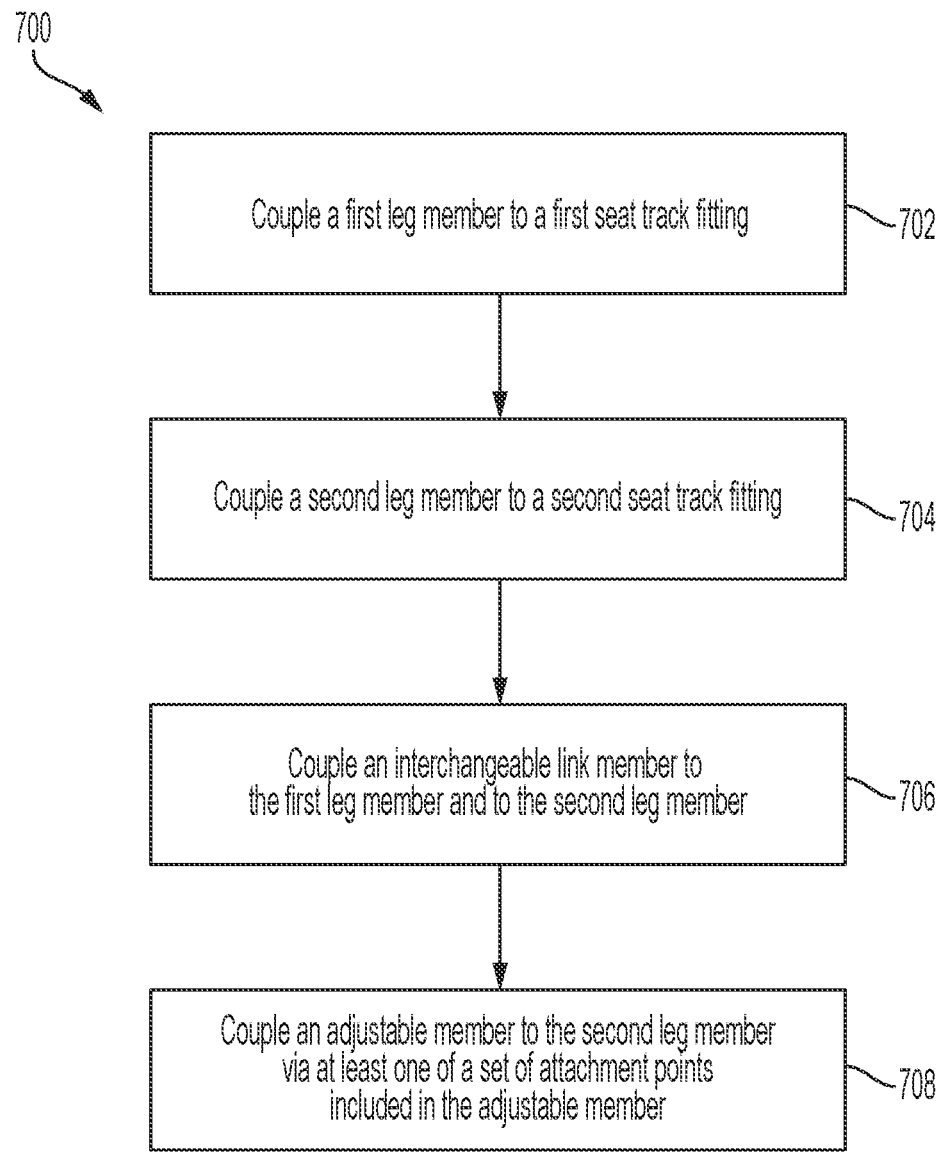
FIG. 7 is a flow chart of a process to manufacture the modular leg assembly of FIG. 2.

FIG. 7 is a flow chart of a method 700 to assemble the modular leg assembly according to certain embodiments of the present invention. At block 702, the method 700 involves coupling the universal first leg member 202 to a first seat track fitting 203. The first seat track fitting 203 may enable the universal first leg member 202 to be coupled to a seat track 207 of a passenger vehicle (e.g., an airplane, a train, etc.). The universal first leg member 202 may be coupled to the first seat track fitting 203 via suitable fasteners, which include but are not limited to screws, bolts, rivets or other mechanical or chemical fasteners.

At block 704, the method 700 involves coupling a universal second leg member 204 to a second seat track fitting 205. The second seat track fitting 205 may enable the universal second leg member 204 to be coupled to a seat track 207 of a passenger vehicle (e.g., an airplane, a train, etc.). The universal second leg member 204 may be coupled to the second seat track fitting 205 via suitable fasteners, which include but are not limited to screws, bolts, rivets or other mechanical or chemical fasteners.

At block 706, the method 700 involves coupling a size specific member 206 to the universal first leg member 202 and to the universal second leg member 204. The size specific member 206 may be chosen based on a distance between the first seat track fitting 203 and the second seat track fitting 205. The size specific member 206 may be coupled to the universal first leg member 202, to the universal second leg member 204, or a combination thereof via suitable fasteners, which include but are not limited to screws, bolts, rivets or other mechanical or chemical fasteners. Additionally, the universal first leg member 202 may be coupled to a first seat tube (e.g., the structural tube 104*b*), and the universal seat frame tube receptor 208 may be coupled to a second seat tube (e.g., the structural tube 104*a*).

At block 708, the method 700 involves coupling a universal seat frame tube receptor 208 to the universal second leg member 204 via at least one of a set of attachment points. The attachment points may include the attachment points 224*a-c*, the attachment points 604*a-c*, other suitable attachment points, or a combination thereof. In some embodiments, the attachment point chosen to couple the universal seat frame tube receptor 208 and the universal second leg member 204 may be chosen based on a distance between the first seat track fitting 203 and the second seat track fitting 205. The universal seat frame tube receptor 208 may be coupled to the universal second leg member 204 via at least one of the attachment points using a fastener, a rotary joint, other suitable mechanical or chemical coupling components, or a combination thereof.

In the following, further examples are described to facilitate the understanding of the invention:

Example 1. A modular leg assembly for a passenger seat, the modular leg assembly comprising: a universal first leg member couplable to a first seat track fitting; a universal second leg member couplable to a second seat track fitting; a size specific member couplable to the universal first leg member and the universal second leg member; and a universal seat frame tube receptor, wherein at least one of the universal second leg member or the universal seat frame tube receptor comprises a plurality of attachment points for coupling the universal seat frame tube receptor to the universal second leg member.

Example 2. The modular leg assembly of any of the preceding or subsequent examples or combination of examples, wherein the universal seat frame tube receptor is couplable to the universal second leg member via at least one of the plurality of attachment points using at least one of a fastener or a rotary joint.

Example 3. The modular leg assembly of any of the preceding or subsequent examples or combination of examples, wherein the plurality of attachment points enable the modular leg assembly to be used for a plurality of distances between the first seat track fitting and the second seat track fitting.

Example 4. The modular leg assembly of any of the preceding or subsequent examples or combination of examples, wherein the universal first leg member is couplable to a first seat tube, and the universal seat frame tube receptor is couplable to a second seat tube.

Example 5. The modular leg assembly of any of the preceding or subsequent examples or combination of examples, wherein the plurality of attachment points enable the modular leg assembly to be used for a plurality of distances between the first seat track fitting and the second seat track fitting while maintaining a set distance between the first seat tube and the second seat tube.

Example 6. The modular leg assembly of any of the preceding or subsequent examples or combination of examples, wherein the universal seat frame tube receptor is rotatable about the second seat tube when coupled to the second seat tube.

Example 7. The modular leg assembly of any of the preceding or subsequent examples or combination of examples, wherein the universal seat frame tube receptor forms an energy absorber for the modular leg assembly.

Example 8. The modular leg assembly of any of the preceding or subsequent examples or combination of examples, wherein the universal seat frame tube receptor is formed of H1150 steel to increase an energy absorption of the universal seat frame tube receptor.

Example 9. The modular leg assembly of any of the preceding or subsequent examples or combination of examples, wherein the size specific member is replaceable with a second size specific member couplable to the universal first leg member and the universal second leg member.

Example 10. A method of assembling a modular leg assembly comprising a universal first leg member, a universal second leg member, a size specific member, and a universal seat frame tube receptor, wherein at least one of the universal second leg member or the universal seat frame tube receptor comprises a plurality of attachment points, the method comprising: coupling the universal first leg member to a first seat track fitting; coupling the universal second leg member to a second seat track fitting; coupling the size specific member to the universal first leg member and the universal second leg member; and coupling the universal seat frame tube receptor to the universal second leg member via at least one of the plurality of attachment points.

Example 11. The method of any of the preceding or subsequent examples or combination of examples, further comprising determining which of the at least one of the plurality of attachment points to couple the universal seat frame tube receptor to the universal second leg member at based on a distance between the first seat track fitting and the second seat track fitting.

Example 12. The method of any of the preceding or subsequent examples or combination of examples, further comprising coupling the universal seat frame tube receptor to the universal second leg member via at least one of the plurality of attachment points using at least one of a fastener or a rotary joint.

Example 13. The method of any of the preceding or subsequent examples or combination of examples, further comprising coupling the universal first leg member to a first seat tube, and coupling the universal seat frame tube receptor to a second seat tube.

Example 14. The method of any of the preceding or subsequent examples or combination of examples, wherein the plurality of attachment points enable the modular leg assembly to be used for a plurality of distances between the first seat track fitting and the second seat track fitting while maintaining a set distance between the first seat tube and the second seat tube.

Example 15. The method of any of the preceding or subsequent examples or combination of examples, wherein the universal seat frame tube receptor forms an energy absorber for the modular leg assembly.

Example 16. A passenger seat comprising a modular leg assembly comprising: a universal first leg member couplable to a first seat track fitting; a universal second leg member couplable to a second seat track fitting; a size specific member couplable to the universal first leg member and the universal second leg member; and a universal seat frame tube receptor, wherein at least one of the universal second leg member or the universal seat frame tube receptor comprises a plurality of attachment points for coupling the universal seat frame tube receptor to the universal second leg member.

Example 17. The passenger seat of any of the preceding or subsequent examples or combination of examples, wherein the universal seat frame tube receptor is couplable to the universal second leg member via at least one of the plurality of attachment points using at least one of a fastener or a rotary joint.

Example 18. The passenger seat of any of the preceding or subsequent examples or combination of examples, wherein the plurality of attachment points enable the modular leg assembly to be used for a plurality of distances between the first seat track fitting and the second seat track fitting.

Example 19. The passenger seat of any of the preceding or subsequent examples or combination of examples, wherein the universal first leg member is couplable to a first seat tube, the universal seat frame tube receptor is couplable to a second seat tube, and the plurality of attachment points enable the modular leg assembly to be used for a plurality of distances between the first seat track fitting and the second seat track fitting while maintaining a set distance between the first seat tube and the second seat tube.

Example 20. The passenger seat of any of the preceding or subsequent examples or combination of examples, wherein the universal seat frame tube receptor forms an energy absorber for the modular leg assembly.

Different arrangements of the components depicted in the drawings or described above, as well as components and steps not shown or described are possible. Similarly, some features and sub-combinations are useful and may be employed without reference to other features and sub-combinations. Embodiments of the invention have been described for illustrative and not restrictive purposes, and alternative embodiments will become apparent to readers of this patent. Accordingly, the present invention is not limited to the embodiments described above or depicted in the drawings, and various embodiments and modifications may be made without departing from the scope of the claims below.

That which is claimed is:

1. A modular leg assembly for a passenger seat, the modular leg assembly comprising:
 a universal first leg member couplable to a first seat track fitting;
 a universal second leg member couplable to a second seat track fitting;
 a size specific member couplable to the universal first leg member and the universal second leg member; and
 a universal seat frame tube receptor, wherein at least one of the universal second leg member or the universal seat frame tube receptor comprises a plurality of attachment points for coupling the universal seat frame tube receptor to the universal second leg member;

wherein the universal seat frame tube receptor is configured to be used for a plurality of distances between the universal first leg member and the universal second leg member.

2. The modular leg assembly of claim 1, wherein the universal seat frame tube receptor is couplable to the universal second leg member via at least one of the plurality of attachment points using at least one of a fastener or a rotary joint.

3. The modular leg assembly of claim 1, wherein the plurality of attachment points enable the modular leg assembly to be used for a plurality of distances between the first seat track fitting and the second seat track fitting.

4. The modular leg assembly of claim 1, wherein the universal first leg member is couplable to a first seat tube, and the universal seat frame tube receptor is couplable to a second seat tube.

5. The modular leg assembly of claim 4, wherein the plurality of attachment points enable the modular leg assembly to be used for a plurality of distances between the first seat track fitting and the second seat track fitting while maintaining a set distance between the first seat tube and the second seat tube.

6. The modular leg assembly of claim 4, wherein the universal seat frame tube receptor is rotatable about the second seat tube when coupled to the second seat tube.

7. The modular leg assembly of claim 1, wherein the universal seat frame tube receptor forms an energy absorber for the modular leg assembly.

8. The modular leg assembly of claim 7, wherein the universal seat frame tube receptor is formed of H1150 steel to increase an energy absorption of the universal seat frame tube receptor.

9. The modular leg assembly of claim 1, wherein the size specific member is replaceable with a second size specific member couplable to the universal first leg member and the universal second leg member.

10. A method of assembling a modular leg assembly comprising a universal first leg member, a universal second leg member, a size specific member, and a universal seat frame tube receptor, wherein at least one of the universal second leg member or the universal seat frame tube receptor comprises a plurality of attachment points, the method comprising:
    coupling the universal first leg member to a first seat track fitting;
    coupling the universal second leg member to a second seat track fitting;
    coupling the size specific member to the universal first leg member and the universal second leg member;
    coupling the universal seat frame tube receptor to the universal second leg member via at least one of the plurality of attachment points; and
    determining which of the at least one of the plurality of attachment points to couple the universal seat frame tube receptor to the universal second leg member at based on a distance between the first seat track fitting and the second seat track fitting.

11. The method of claim 10, further comprising coupling the universal seat frame tube receptor to the universal second leg member via at least one of the plurality of attachment points using at least one of a fastener or a rotary joint.

12. The method of claim 10, further comprising coupling the universal first leg member to a first seat tube, and coupling the universal seat frame tube receptor to a second seat tube.

13. The method of claim 12, wherein the plurality of attachment points enable the modular leg assembly to be used for a plurality of distances between the first seat track fitting and the second seat track fitting while maintaining a set distance between the first seat tube and the second seat tube.

14. The method of claim 10, wherein the universal seat frame tube receptor forms an energy absorber for the modular leg assembly.

15. A passenger seat comprising a modular leg assembly comprising:
    a universal first leg member couplable to a first seat track fitting;
    a universal second leg member couplable to a second seat track fitting;
    a size specific member couplable to the universal first leg member and the universal second leg member; and
    a universal seat frame tube receptor, wherein at least one of the universal second leg member or the universal seat frame tube receptor comprises a plurality of attachment points for coupling the universal seat frame tube receptor to the universal second leg member;
    wherein the universal first leg member is couplable to a first seat tube, the universal seat frame tube receptor is couplable to a second seat tube, and the universal seat frame tube receptor is configured to be used for a plurality of distances between the first seat track fitting and the second seat track fitting while maintaining a set distance between the first seat tube and the second seat tube.

16. The passenger seat of claim 15, wherein the universal seat frame tube receptor is couplable to the universal second leg member via at least one of the plurality of attachment points using at least one of a fastener or a rotary joint.

17. The passenger seat of claim 15, wherein the plurality of attachment points enable the modular leg assembly to be used for a plurality of distances between the first seat track fitting and the second seat track fitting.

18. The passenger seat of claim 15, wherein the universal seat frame tube receptor forms an energy absorber for the modular leg assembly.

19. The method of claim 14, wherein the universal seat frame tube receptor is formed of H1150 steel to increase an energy absorption of the universal seat frame tube receptor.

20. The passenger seat of claim 18, wherein the universal seat frame tube receptor is formed of H1150 steel to increase an energy absorption of the universal seat frame tube receptor.

* * * * *